United States Patent
Killian et al.

(10) Patent No.: US 8,831,854 B2
(45) Date of Patent: Sep. 9, 2014

(54) ACTIVE SHIMMY MITIGATION

(75) Inventors: Douglas W. Killian, Fenton, MI (US); Amanda J. French, Farmington Hills, MI (US); Loren M. Trotter, Linden, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 321 days.

(21) Appl. No.: 12/856,909

(22) Filed: Aug. 16, 2010

(65) Prior Publication Data

US 2012/0041660 A1 Feb. 16, 2012

(51) Int. Cl.
*B60T 8/173* (2006.01)
*B60T 8/1755* (2006.01)

(52) U.S. Cl.
CPC ............ *B60T 8/17555* (2013.01); *B60T 8/173* (2013.01)
USPC .................. 701/83; 701/45; 701/75; 701/78; 188/73.35

(58) Field of Classification Search
None
See application file for complete search history.

(56) References Cited

U.S. PATENT DOCUMENTS

| | | | | |
|---|---|---|---|---|
| 4,619,338 A | * | 10/1986 | Higashi et al. | 180/422 |
| 4,645,025 A | * | 2/1987 | Ohe et al. | 180/412 |
| 4,686,438 A | * | 8/1987 | Ohe et al. | 318/280 |
| 4,715,461 A | * | 12/1987 | Shimizu | 180/446 |
| 4,719,445 A | * | 1/1988 | Fremd | 340/438 |
| 4,792,008 A | * | 12/1988 | Hosotani | 180/422 |
| 5,386,372 A | * | 1/1995 | Kobayashi et al. | 700/280 |
| 5,406,834 A | * | 4/1995 | Taniguchi | 73/117.02 |
| 5,473,231 A | * | 12/1995 | McLaughlin et al. | 318/433 |
| 5,504,403 A | * | 4/1996 | McLaughlin | 318/432 |
| 5,816,587 A | * | 10/1998 | Stewart et al. | 280/5.516 |
| 5,919,241 A | * | 7/1999 | Bolourchi et al. | 701/41 |
| 5,927,429 A | * | 7/1999 | Sugino et al. | 180/444 |
| 6,013,994 A | * | 1/2000 | Endo et al. | 318/432 |
| 6,062,123 A | * | 5/2000 | Obata et al. | 91/375 A |
| 6,122,579 A | * | 9/2000 | Collier-Hallman et al. | 701/41 |
| 6,131,693 A | * | 10/2000 | Mukai et al. | 180/446 |
| 6,161,068 A | * | 12/2000 | Kurishige et al. | 701/41 |
| 6,176,341 B1 | * | 1/2001 | Ansari | 180/402 |

(Continued)

FOREIGN PATENT DOCUMENTS

| | | |
|---|---|---|
| DE | 10325623 A1 | 12/2004 |
| DE | 102005047142 A1 | 4/2007 |
| DE | 102008033896 A1 | 4/2009 |

OTHER PUBLICATIONS

J Klaps, "Steering drift and wheel movement during braking: static and dynamic measurements," Proc. IMechE. vol. 219 Part D; J. Automobile Engineering, Jan. 2005.*

(Continued)

*Primary Examiner* — Thomas Tarcza
*Assistant Examiner* — Richard Goldman
(74) *Attorney, Agent, or Firm* — Ralph E. Smith

(57) ABSTRACT

A system mitigates shimmy of a wheel of a vehicle. The wheel is rotatable about an axis and is steerable by varying a steering angle of the wheel about a steering axis. The system includes a shimmy detection device that detects whether an oscillation/shimmy of the steering angle of the wheel occurs. The system also includes a brake that applies a braking load to decelerate rotation of the wheel about the axis. Furthermore, the system includes a controller that controls the brake to selectively apply the braking load to reduce the oscillation/shimmy of the steering angle of the wheel.

9 Claims, 3 Drawing Sheets

(56) References Cited

U.S. PATENT DOCUMENTS

| | | | |
|---|---|---|---|
| 6,263,738 B1 * | 7/2001 | Hogle | 73/593 |
| 6,326,753 B1 * | 12/2001 | Someya et al. | 318/471 |
| 6,360,151 B1 * | 3/2002 | Suzuki et al. | 701/41 |
| 6,370,459 B1 * | 4/2002 | Phillips | 701/41 |
| 6,454,303 B2 * | 9/2002 | Ashtiani et al. | 280/779 |
| 6,464,050 B2 * | 10/2002 | Smith et al. | 188/267.1 |
| 6,502,025 B1 * | 12/2002 | Kempen | 701/41 |
| 6,547,043 B2 * | 4/2003 | Card | 188/267.2 |
| 6,548,969 B2 * | 4/2003 | Ewbank et al. | 318/34 |
| 6,615,124 B1 * | 9/2003 | Adachi | 701/70 |
| 6,622,576 B1 * | 9/2003 | Nakano et al. | 73/862.331 |
| 6,622,813 B2 * | 9/2003 | Matz et al. | 180/411 |
| 6,647,329 B2 * | 11/2003 | Kleinau et al. | 701/41 |
| 6,681,165 B2 * | 1/2004 | Shibasaki et al. | 701/41 |
| 6,681,883 B2 * | 1/2004 | Loh et al. | 180/417 |
| 6,687,588 B2 * | 2/2004 | Demerly et al. | 701/41 |
| 6,725,965 B2 * | 4/2004 | Kogiso et al. | 180/446 |
| 6,736,604 B2 * | 5/2004 | Okada et al. | 417/213 |
| 6,752,425 B2 * | 6/2004 | Loh et al. | 280/779 |
| 6,827,177 B2 * | 12/2004 | Asada et al. | 180/446 |
| 6,856,869 B2 * | 2/2005 | Takahashi | 701/41 |
| 6,927,548 B2 * | 8/2005 | Nishizaki et al. | 318/432 |
| 6,938,725 B2 * | 9/2005 | Fujioka et al. | 180/446 |
| 6,965,820 B2 * | 11/2005 | Amberkar et al. | 701/41 |
| 6,968,262 B2 * | 11/2005 | Higashi et al. | 701/41 |
| 6,999,862 B2 * | 2/2006 | Tamaizumi et al. | 701/41 |
| 7,005,822 B1 * | 2/2006 | O'Gorman et al. | 318/608 |
| 7,032,704 B2 * | 4/2006 | Zernickel et al. | 180/444 |
| 7,079,929 B2 * | 7/2006 | Sawada et al. | 701/41 |
| 7,159,688 B2 * | 1/2007 | Onizuka et al. | 180/444 |
| 7,165,644 B2 * | 1/2007 | Offerle et al. | 180/244 |
| 7,308,964 B2 * | 12/2007 | Hara et al. | 180/446 |
| 7,316,419 B2 * | 1/2008 | Fischer | 280/779 |
| 7,406,375 B2 * | 7/2008 | Fujita et al. | 701/41 |
| 7,426,978 B2 * | 9/2008 | Onizuka et al. | 180/444 |
| 7,469,176 B2 * | 12/2008 | Turner et al. | 701/41 |
| 7,540,351 B2 * | 6/2009 | Kataoka et al. | 180/446 |
| 7,604,088 B2 * | 10/2009 | Nishizaki et al. | 180/446 |
| 7,694,777 B2 * | 4/2010 | Yamashita et al. | 180/443 |
| 7,743,874 B2 * | 6/2010 | Yasui et al. | 180/444 |
| 7,823,708 B2 * | 11/2010 | Maranville et al. | 183/267 |
| 7,828,111 B2 * | 11/2010 | Yamashita et al. | 180/443 |
| 7,862,056 B2 * | 1/2011 | Zeid et al. | 280/89 |
| 7,954,593 B2 * | 6/2011 | Dornhege et al. | 180/446 |
| 8,050,825 B2 * | 11/2011 | Ikeda et al. | 701/42 |
| 8,055,409 B2 * | 11/2011 | Tsuchiya | 701/41 |
| 8,073,592 B2 * | 12/2011 | Nishimori et al. | 701/39 |
| 8,115,429 B2 * | 2/2012 | Ueda et al. | 318/400.02 |
| 8,116,945 B2 * | 2/2012 | Nozawa | 701/41 |
| 8,209,089 B2 * | 6/2012 | Tanaka et al. | 701/41 |
| 8,219,283 B2 * | 7/2012 | Recker et al. | 701/41 |
| 2002/0033300 A1 * | 3/2002 | Takeuchi et al. | 180/446 |
| 2002/0059824 A1 * | 5/2002 | Ono et al. | 73/146 |
| 2004/0245041 A1 * | 12/2004 | Fukuda et al. | 180/444 |
| 2005/0087390 A1 * | 4/2005 | Furumi et al. | 180/446 |
| 2005/0119810 A1 * | 6/2005 | Kasbarian et al. | 701/36 |
| 2005/0192727 A1 * | 9/2005 | Shostak et al. | 701/37 |
| 2005/0206234 A1 * | 9/2005 | Tseng et al. | 303/146 |
| 2005/0236894 A1 * | 10/2005 | Lu et al. | 303/139 |
| 2005/0257992 A1 * | 11/2005 | Shiino et al. | 180/444 |
| 2006/0001392 A1 * | 1/2006 | Ajima et al. | 318/432 |
| 2006/0066270 A1 * | 3/2006 | Kumagai et al. | 318/139 |
| 2007/0107978 A1 * | 5/2007 | Aoki et al. | 180/446 |
| 2007/0118262 A1 * | 5/2007 | Nishizaki et al. | 701/41 |
| 2007/0198153 A1 * | 8/2007 | Oya et al. | 701/41 |
| 2007/0201704 A1 * | 8/2007 | Ishii et al. | 381/94.1 |
| 2008/0262678 A1 * | 10/2008 | Nishimura et al. | 701/42 |
| 2008/0297077 A1 * | 12/2008 | Kovudhikulrungsri et al. | 318/400.02 |
| 2009/0294206 A1 * | 12/2009 | Oblizajek et al. | 180/446 |
| 2011/0029200 A1 * | 2/2011 | Shah | 701/41 |
| 2011/0043144 A1 * | 2/2011 | Ueda et al. | 318/400.02 |
| 2012/0006612 A1 * | 1/2012 | Wilson-Jones et al. | 180/446 |
| 2012/0013173 A1 * | 1/2012 | Leiber et al. | 303/9.75 |
| 2012/0041660 A1 * | 2/2012 | Killian et al. | 701/70 |
| 2012/0061169 A1 * | 3/2012 | Oblizajek et al. | 180/446 |
| 2012/0081234 A1 * | 4/2012 | Shaffer et al. | 340/905 |
| 2012/0150388 A1 * | 6/2012 | Boissonnier et al. | 701/41 |
| 2012/0150389 A1 * | 6/2012 | Oblizajek et al. | 701/42 |

OTHER PUBLICATIONS

International Search Report dated Nov. 30, 2011 for International Application No. PCT/US2011/047726, International Filing Date Aug. 15, 2011.

Written Opinion dated Nov. 30, 2011 for International Application No. PCT/US2011/047726, International Filing Date Aug. 15, 2011.

* cited by examiner

ACTIVE SHIMMY MITIGATION

FIELD

The following relates to a vehicle and, more particularly, relates to a system for active shimmy mitigation of a vehicle.

BACKGROUND

Vehicle shimmy can occur in the steerable wheels of a vehicle. For instance, the steerable front wheels of a vehicle can shimmy (i.e., inadvertently oscillate, turning left and right repeatedly) due to vehicle damage, due to particular road conditions, etc. This type of shimmy event can reduce ride comfort and quality.

Typically, vehicle steering systems include mechanical, viscous or passive-element dampers to reduce vehicle shimmy. However, these dampers can wear over time or can be damaged, for instance, if the vehicle drives over particularly rough terrain.

SUMMARY

A system for mitigating shimmy of a wheel of a vehicle is disclosed. The wheel is rotatable about an axis and is steerable by varying a steering angle of the wheel about a steering axis. The system includes a shimmy detection device that detects whether an oscillation/shimmy of the steering angle of the wheel occurs. The system also includes a brake that applies a braking load to decelerate rotation of the wheel about the axis. Furthermore, the system includes a controller that controls the brake to selectively apply the braking load to reduce the oscillation/shimmy of the steering angle of the wheel.

Moreover, a method of reducing shimmy of a wheel of a vehicle is disclosed. The wheel is rotatable about an axis, and the wheel is steerable by varying a steering angle of the wheel about a steering axis. The method includes detecting an oscillation/shimmy of the steering angle of the wheel. The method also includes selectively applying a braking load to decelerate rotation of the wheel about the axis and to reduce the oscillation/shimmy of the steering angle of the wheel.

Further areas of applicability of the present disclosure will become apparent from the detailed description provided hereinafter. It should be understood that the detailed description and specific examples, while indicating preferred embodiments of the present disclosure, are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

The following description of the preferred embodiment(s) is merely exemplary in nature and is in no way intended to limit the invention, its application, or uses.

Figure 1:
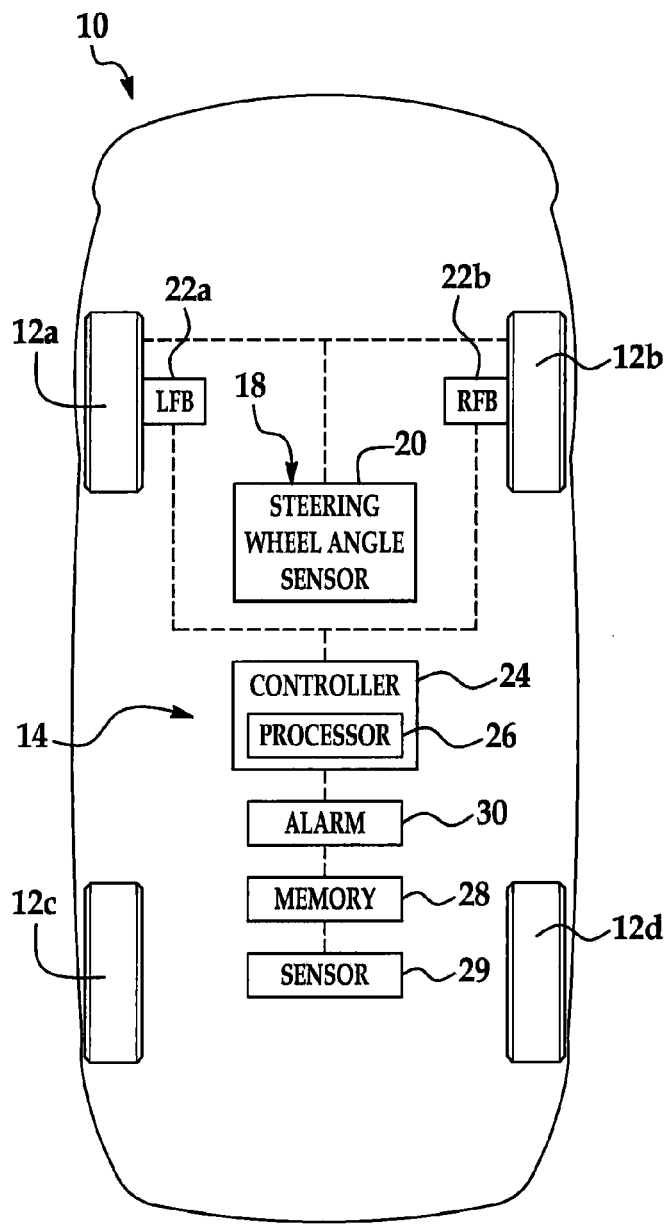
FIG. 1 is a schematic view of a system for mitigating shimmy of a vehicle according to various exemplary embodiments of the present disclosure.

Referring initially to FIG. 1, a vehicle 10 is illustrated. The vehicle 10 can include a front, left wheel 12a, a front, right wheel 12b, a rear, left wheel 12c, and a rear, right wheel 12d. In some embodiments, the rear wheels 12c, 12d are not steerable, and the front wheels 12a, 12b are steerable. More specifically, in some embodiments, a driver (not shown) can selectively steer the front wheels 12a, 12b (e.g., turn the wheels 12a, 12b left and right relative to the rest of the vehicle 10) by turning a steering wheel (not shown) inside the passenger compartment of the vehicle 10. As such, the steering angle of the wheels 12a, 12b can be varied as will be discussed in greater detail below.

Also, the front wheels 12a, 12b can be operably coupled to the steering wheel by mechanical linkages (e.g., rack and pinion system) and/or via electronic connections to define a steer-by-wire system, a fully mechanical steering system, or any other suitable type of steering system. Moreover, the front wheels 12a, 12b can be operably coupled together such that the front wheels 12a, 12b turn in tandem to cooperatively steer the vehicle 10.

The vehicle 10 further includes one or more sensors. The sensors can detect any one of various characteristics of the vehicle 10. For instance, the sensor can detect a change in a steering component, a tire pressure of the wheels 12a-12d, an ambient temperature in which the vehicle 10 is operating, an operating time of the vehicle 10, a wet or dry road condition, etc. to provide a shimmy mitigation braking signal based on vehicle shimmy history and vehicle component conditions and will be described in greater detail below. In another embodiment, one or more sensors detect vehicle acceleration in one or more directions, such as longitudinal, lateral and yaw. This data can be utilized to determine if a shimmy event is the result of vehicle operator actions, a vehicle component, or other driving conditions.

The vehicle 10 can also include brakes 22a, 22b. For instance, the vehicle 10 can include a left front brake 22a and a right front brake 22b. The left front brake 22a can be operably coupled to the left front wheel 12a for selectively applying a braking load thereto, and the right front brake 22b can be operably coupled to the right front wheel 12b for selectively applying a braking load thereto. Accordingly, the brakes 22a, 22b can selectively decelerate rotation of the respective wheels 12a, 12b.

The brakes 22a, 22b can include brake calipers, rotors, drum brakes, or any other suitable brake components. Also, the brakes 22a, 22b can be part of an anti-lock brake system (ABS) and/or an electronic braking control system (EBC), which controls the brakes 22a, 22b for reducing locking of the wheels 12a, 12b, improving stability of the vehicle 10, etc. Furthermore, it will be appreciated that the vehicle 10 can include brakes that are operably coupled to the rear wheels 12c, 12d.

Moreover, the vehicle 10 can include a shimmy mitigation system 14 for mitigating shimmy of the front wheels 12a, 12b. It will be appreciated that shimmying of the front wheels 12a, 12b can be at least in part due to an oscillation of the steering angle of the wheels 12a, 12b, as will be discussed in greater detail below. Thus, during a shimmy event, both the front wheels 12a, 12b can inadvertently oscillate, turning left and turning right.

In the embodiments illustrated, the vehicle 10 is a passenger car with four wheels 12a-12d. However, it will be appreciated that the vehicle 10 can be of any other type (truck, motor home, etc.) with any suitable number of wheels 12a-12d without departing from the scope of the present disclosure. It will also be appreciated that the rear wheels 12c, 12d can be steerable in some embodiments, and the system 14 can be adapted for mitigating shimmy of the rear wheels 12c, 12c without departing from the scope of the present disclosure.

Figure 2:
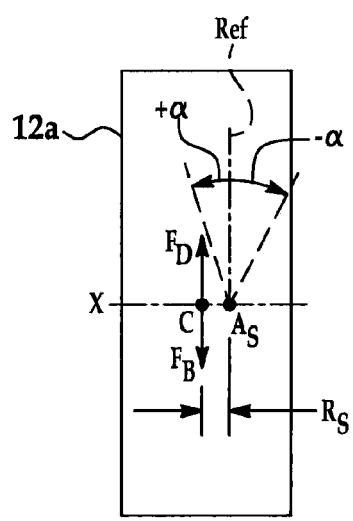
FIG. 2 is a schematic view of a left front wheel of the vehicle of FIG. 1.

Referring now to FIG. 2, the steerable front wheels 12a, 12b will be discussed in greater detail. Although only the left front wheel 12a is illustrated, it will be appreciated that the right front wheel 12b can operate in a substantially similar manner.

The wheel 12a can be rotatable about an axis X (i.e., a central or horizontal axis). For instance, assuming that the vehicle 10 is a front wheel drive vehicle, a drive load $F_D$ (torque) can drivingly rotate the wheel 12a about the axis X to thereby propel the vehicle 10. Also, when the brake 22a is applied, a braking load $F_B$ (brake torque) is applied to decelerate rotation of the wheel 12a and to decelerate the vehicle 10.

Furthermore, the wheel 12a can be steerable by rotating the wheel 12a about a steering axis $A_s$. (The steering axis $A_S$ can extend normal to the page, substantially normal to the page, or otherwise out of the page of FIG. 2.) When the wheel 12a is steered and rotated about the steering axis $A_S$, a steering angle $\alpha$ is varied. The steering angle $\alpha$ has been labeled in FIG. 2 such that, when the wheel 12a is steered straight ahead (the reference direction), the steering angle $\alpha$ is zero degrees, when the wheel 12a turns to the left, the steering angle $\alpha$ is positive, and when the wheel 12a turns to the right, the steering angle $\alpha$ is negative.

The front wheels 12a, 12b (FIG. 1) of the vehicle 10 can be coupled so as to steer in tandem. As such, the steering angle $\alpha$ for both front wheels 12a, 12b can be substantially equal.

During a shimmy event, the steering angle $\alpha$ of the wheels 12a, 12b oscillates back and forth. For instance, in some instances, the steering angle $\alpha$ repeatedly oscillates between positive and negative values such that the wheels 12a, 12b inadvertently turn left and right, respectively.

It will be appreciated that the steering angle $\alpha$ in FIG. 2 has been labeled in the above-described manner for purposes of discussion only. The steering angle $\alpha$ could be positive when turning to the right, and the steering angle $\alpha$ could be negative when turning to the left. Also, the reference direction at which the steering angle $\alpha$ is zero can be any suitable direction other than straight ahead travel of the vehicle 10.

Still referring to FIG. 2, it will be appreciated that the wheel 12a can have a scrub radius $R_s$ defined between the steering axis $A_s$ and the center C of the wheel 12a. The scrub radius $R_s$ can be of any suitable value, positive or negative.

It will be appreciated that because the braking load $F_B$ acts substantially at the center C of the wheel 12 and because there is a moment arm (the scrub radius $R_s$) between the braking load $F_B$ and the steering axis $A_s$, application of the braking load $F_B$ biases and rotates the wheel 12a about the steering axis $A_s$.

As will be discussed in greater detail, the shimmy mitigation system 14 can rely on this phenomenon to reduce shimmy of the wheels 12a, 12b. For instance, during the shimmy event, when the wheel 12a turns toward the right (negative or less positive steering angle $\alpha$), one or more of the brakes 22a, 22b can be selectively applied to bias the wheel 12a toward the left (positive or less negative steering angle $\alpha$), and vice versa. Accordingly, shimmying can be mitigated or damped. It will be appreciated that the system 14 can be used in addition to or instead of conventional mechanical, viscous or passive-element shimmy dampers.

Referring back to FIG. 1, the system 14 will be described in greater detail. As shown, the system 14 can include a shimmy detection device 18 that is operably coupled to the front wheels 12a, 12b for detecting whether an oscillation/shimmy of the steering angle $\alpha$ occurs. In some embodiments, the shimmy detection device 18 can include a steering angle sensor 20. The steering angle sensor 20 can be of any suitable type for detecting the steering angle of the wheels 12a, 12b. Also, and in some embodiments, the steering angle sensor 20 can be directly and operably coupled to a steering wheel of the vehicle (not shown), such that the steering angle sensor 20 is a steering wheel angle sensor 20, including those of a largely conventional type.

In some embodiments, the shimmy detection device 18 can determine a magnitude of the steering angle $\alpha$ without determining whether the steering angle $\alpha$ is positive or negative (i.e., without determining whether the wheel is turning left or right). In other embodiments, the shimmy detection device 18 can determine the magnitude and the direction of the steering angle $\alpha$. In some embodiments, the shimmy detection device 18 can also include an accelerometer in addition to the steering wheel angle sensor 20 to determine the magnitude and direction of the steering angle $\alpha$.

The system 14 can further include a controller 24 in communication with the sensors. The controller 24 can be part of, in communication with, or distinct and separate from an engine control unit (ECU) or other control system of the vehicle 10. Furthermore, the controller 24 can be in communication with the brakes 22a, 22b for selectively applying the brake loads $F_B$ to the wheels 12a, 12b. Also, the controller 24 can include a hydraulic control unit for controlling and modifying fluid pressure to thereby control the brakes 22a, 22b.

The controller 24 can include and/or be in communication with a processor 26 that performs calculations for mitigating the shimmy event based on sensor data and other instructions as will be discussed. The processor 26 can have any suitable processing speed and can be of any suitable type. The controller 24 can be configured to make a determination if a shimmy event is the result of vehicle operator actions, a vehicle component, or other driving conditions.

The controller 24 can also be in communication with and/or include a memory module 28. The memory 28 can be of any suitable capacity, and can be of any suitable type, such as random access memory (RAM) and/or read only memory (ROM). As will be discussed in greater detail below, the memory 28 can be used for storing look-up tables or other data characterizing previously tested shimmy conditions. The memory 28 can also be used for storing data gathered during shimmy events that occur during actual use of the vehicle 10.

In addition, the system 14 can include an alarm 30. The alarm 30 can be of any suitable type for indicating that a shimmy event is occurring and/or has occurred. It will be appreciated that the alarm 30 can be a visual alarm (e.g., light, lamp, etc.), an audible alarm, a tactile alarm (e.g., a vibrating surface, etc.), or any other suitable type.

Figure 3:
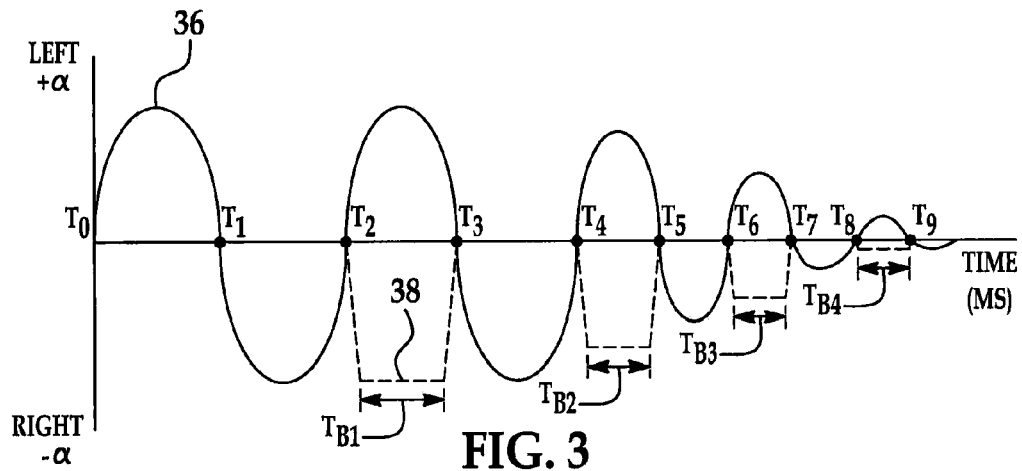
FIG. 3 is a graphical representation of a shimmy event and operation of the system of FIG. 1 according to various exemplary embodiments.

Now referring to FIG. 3, operation of the shimmy mitigation system 14 will be described in greater detail. As shown in FIG. 3, the shimmy event can produce a wheel oscillation/shimmy represented as curve 36, wherein the front wheels 12a, 12b oscillate and repeatedly turn left and right. (As shown, the X-axis represents time, and the Y-axis represents a steering angle detected by the sensor 20, wherein a positive steering angle +α represents turning to the left and a negative steering angle −α represents turning to the right.) As shown, the oscillation 36 can be substantially sinusoidal; however, it will be appreciated that the oscillation 36 can have any non-sinusoidal waveform.

Also, the shimmy mitigating system 14 can operate according to the braking signal 38 to mitigate the shimmy event. (The braking signal 38 can represent the direction of bias applied to the wheels 12a, 12b by the brake(s) 22a, 22b.) As shown, the braking signal 38 can be substantially opposite the wheel oscillation 36 during particular time intervals. For instance, in the embodiment of FIG. 3, the magnitude (amplitude) of the braking signal 38 is approximately equal to negative one (−1) times the detected magnitude of the oscillation 36.

More specifically, the shimmy detection device 18 can detect the shimmy event occurring between the time period $T_0$ to $T_2$. Also, the shimmy detection device 18 can detect particular characteristics of the shimmy event and/or the wheel oscillation 36 (e.g., the frequency, the amplitude, the number of the oscillations, etc.). The shimmy detection device 18 can communicate this information to the controller 24.

Then, the controller 24 can refer to lookup tables or the like within the memory module 28 to determine a target braking signal 38 (i.e., target braking load, target braking time interval, etc.) that will substantially mitigate the particular oscillation 36. In other embodiments, the processor 26 calculates the target braking signal 38 that will mitigate the oscillation 36. Once the braking signal 38 is determined, the controller 24 can control one or more of the brakes 22a, 22b (here, the right front brake 22b) to selectively apply the braking load $F_B$ at the particular time intervals ($T_{B1}$, $T_{B2}$, $T_{B3}$, $T_{B4}$) to mitigate the shimmy.

Accordingly, the wheels 12a, 12b turn left during the time interval between $T_0$ and $T_1$, the wheels 12a, 12b turn right between $T_1$ and $T_2$, and so on. Then, as represented by braking signal 38, the right front brake 22b is applied between $T_2$ and $T_3$ (time interval $T_{B1}$) Accordingly, although the wheels 12a, 12b are oscillating to the left during this time interval, the braking force $F_B$ from the right front brake 22b biases the wheels 12a, 12b to turn to the right to reduce the shimmying. Subsequently, the right front brake 22b can be applied during the time intervals $T_{B2}$, $T_{B3}$, and $T_{B4}$ (i.e., when the wheels 12a, 12b are turned left). As shown, the shimmying can eventually be reduced and/or completely damped out.

In the embodiment of FIG. 3, only one of the brakes, the right front brake 22b, is applied at predetermined time intervals to mitigate the shimmy event. However, it will be appreciated that the left front brake 22a could be applied instead of the right front brake 22b in the embodiment of FIG. 3 to mitigate the shimmy event. More specifically, the left front brake 22a can be applied during the time intervals $T_2$-$T_4$-$T_3$, $T_6$-$T_5$, $T_8$-$T_7$ in order to mitigate the shimmy event.

Furthermore, in some embodiments, both of the left and right front brakes 22a, 22b can be alternatingly applied to mitigate the shimmy event. More specifically, as shown in the embodiment of FIG. 4, the right front brake 22b can be applied during the time interval $T_3$-$T_2$, the left front brake 22a can be applied during the time interval $T_4$-$T_3$, and so on, until the shimmy event represented by the oscillation 36' is damped and/or substantially reduced to zero.

Thus, the shimmy mitigation system 14 can detect that the shimmy event is occurring. Then, the system 14 can determine which of the left or right front brakes 22a, 22b to operate and when to apply the brake(s) 22a, 22b for reducing the shimmy event.

Figure 4:
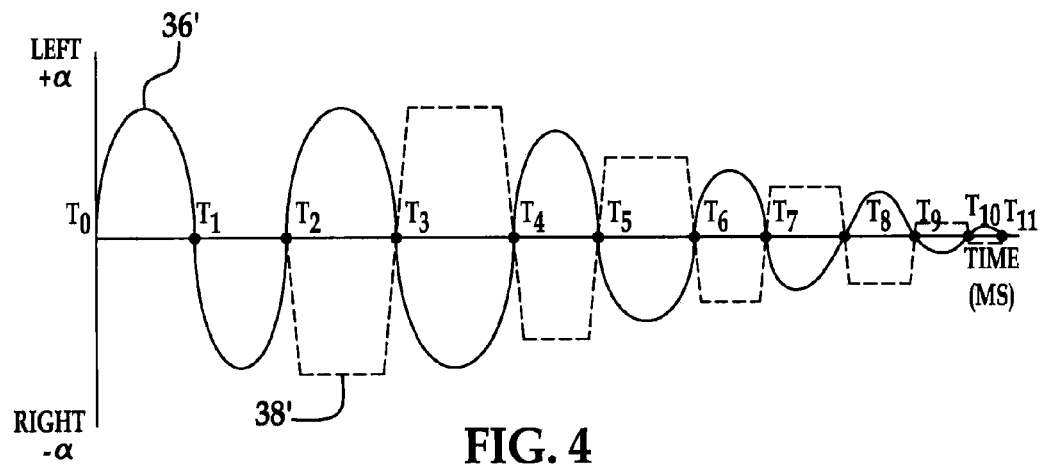
FIG. 4 is a graphical representation of a shimmy event and operation of the system of FIG. 1 according to various additional exemplary embodiments.
Figure 5:
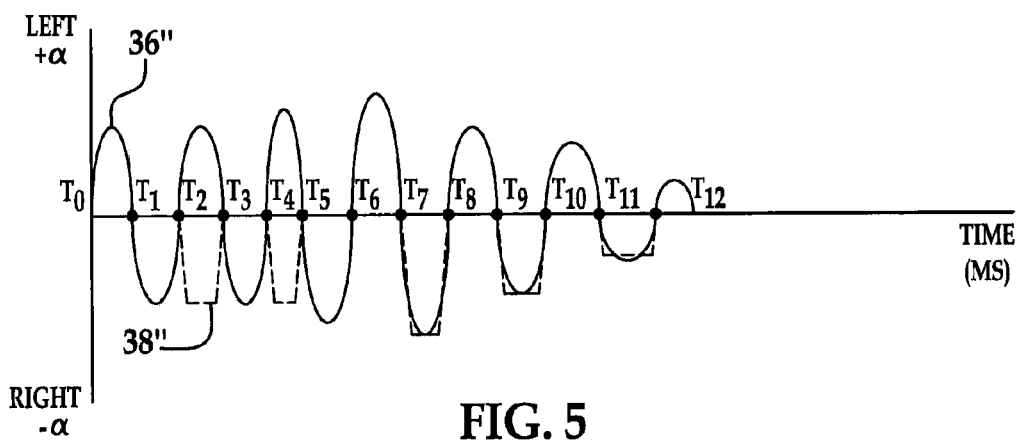
FIG. 5 is a graphical representation of a shimmy event and operation of the system of FIG. 1 according to various additional exemplary embodiments.

It will be appreciated that the embodiments in FIGS. 3 and 4 can be implemented for reducing shimmy when the shimmy event is in phase with the shimmy detection device 18. However, the system 14 can be operated for mitigating shimmy when the wheel oscillation and the shimmy detection device 18 are out of phase, as represented in the embodiment of FIG. 5. More specifically, if the shimmy detection device 18 relies on a steering wheel angle sensor 20 that detects the angle of the steering wheel, the oscillation/shimmy of the steering wheel and the wheels 12a, 12b may be out of phase (i.e., opposite each other). Even in this out of phase condition, the system 14 can mitigate shimmy as shown in FIG. 5.

Specifically, the shimmy event is detected between the time interval $T_2$-$T_0$, and the controller 24 outputs a first control signal to cause the right front brake 22b to be applied between the time interval $T_3$-$T_2$ and also between the time interval $T_5$-$T_4$. Then, the shimmy detection device 18 detects that the shimmying increases (i.e., the oscillation 36" increases) due to the application of the right front brake 22b during these time intervals. As shown, the shimmy detection device 18 detects that the shimmying is increasing between the time intervals $T_7$-$T_2$. As a result, the controller 24 can output a second, corrective control signal that is time shifted by one half period (180 degrees) to cause the right front brake 22b to apply the respective braking load during the time interval $T_8$-$T_7$, during the time interval $T_{10}$-$T_9$, during the time interval $T_{12}$-$T_{11}$, and so on.

It will be appreciated that, in the embodiments of FIG. 5, the system 14 applies only one brake 22a, 22b at a time to mitigate the shimmy event (similar to the embodiment of FIG. 3). However, it will be appreciated that the system 14 can alternatingly apply the brakes 22a, 22b to mitigate the shimmy event (similar to the embodiment of FIG. 4).

Figure 6:
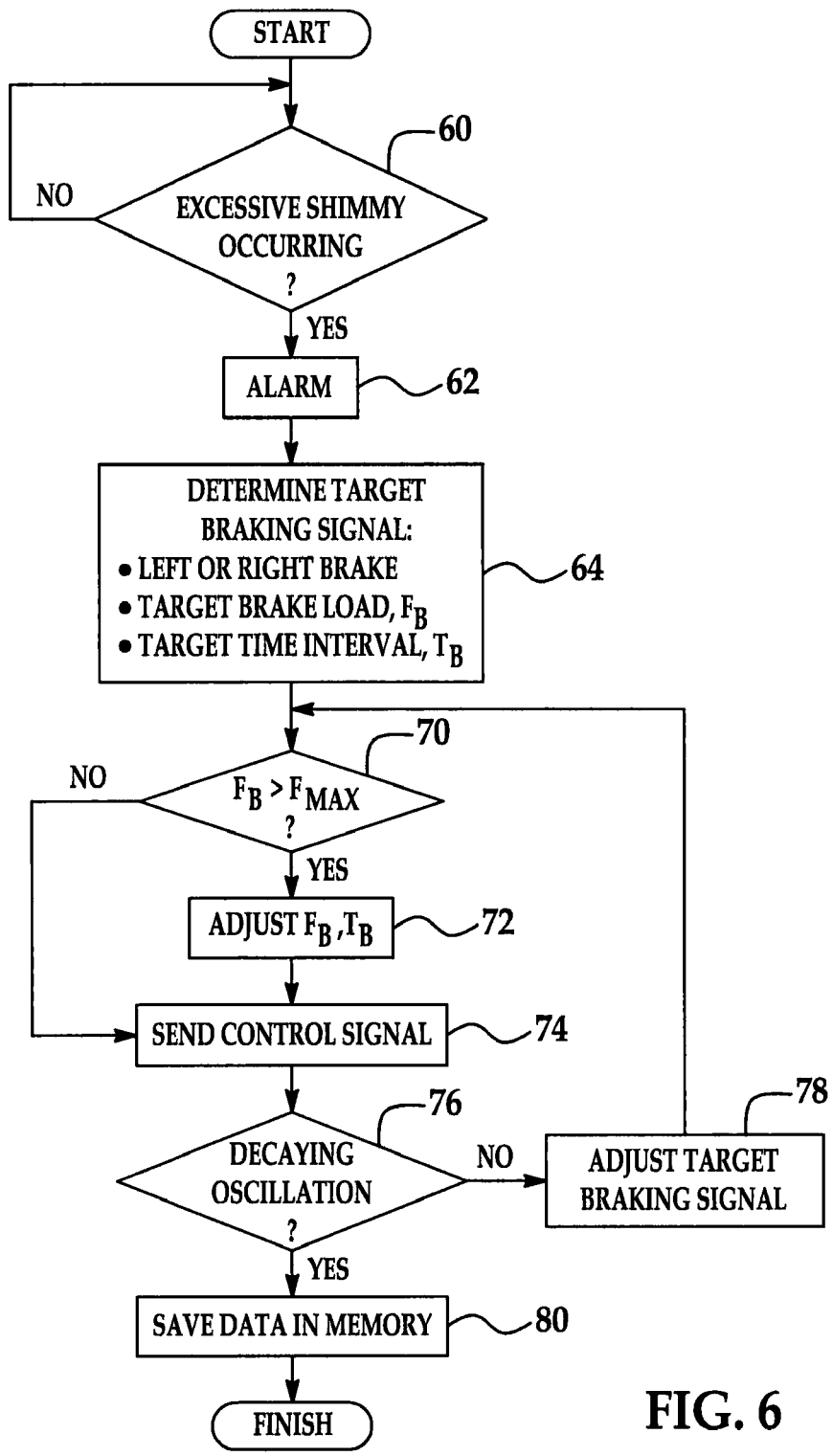
FIG. 6 is a flowchart illustrating operation of the system of FIG. 1 according to various additional exemplary embodiments.

Referring now to FIG. 6, additional details of the operation of the shimmy mitigation system 14 will be discussed. As shown, the method can begin in decision block 60, in which it is determined whether the shimmy event (i.e., underdamped oscillation/shimmy of the steering angle α) is occurring. As shown, the method can repeatedly monitor and determine whether the shimmy event is occurring. If the shimmy event is detected (decision block 60 answered affirmatively), then the alarm 30 can be operated 60 (i.e., light, noise, etc. is emitted) to thereby indicate to the user that the shimmy event is occurring. In some embodiments, the alarm 30 is not operated unless the shimmy event occurs multiple times and/or is above a predetermined threshold. Furthermore, in some embodiments, the alarm 30 is operated if the shimmy event occurs only once, and the alarm 30 eventually turns off if there are no further shimmy events during a predetermined time.

Then, in step 64 (FIG. 6), the controller 24 determines the target braking signal 38, 38', 38" (FIGS. 3-5) according to the shimmy detected in decision block 60. More specifically, the controller 24 can determine whether the left or right brake 22a, 22b should be applied, the target braking load $F_B$ for the brake(s) 22a, 22b, and the target time interval $T_B$ during which to apply the braking loads $F_B$. In embodiments in which the vehicle 10 includes steerable wheels other than the front wheels 12a, 12b, such as steerable rear wheels 12c, 12d, step 64 can include determining a target braking signals 38, 38', 38" for those wheels 12c, 12d.

Next, in decision block 70, it is determined whether the target braking load $F_B$ will exceed any predetermined braking limit $F_{MAX}$. If the target braking load $F_B$ does not exceed the limit $F_{MAX}$ (decision block 70 answered negatively), the controller 24 outputs a corresponding target braking control signal to the left front brake 22a and/or the right front brake 22b in step 74. However, if the target braking load $F_B$ exceeds the limit $F_{MAX}$ (decision block 70 answered affirmatively), then, in step 72, the controller 24 adjusts the braking load $F_B$ and the time interval $T_B$ for applying the braking load $F_B$. More specifically, the controller 24 can decrease the target braking load $F_B$ and increase the target time interval $T_B$. Then, the controller 24 outputs the corresponding target braking control signal in step 74.

Next, in decision block 76, it is determined whether the control signal transmitted in step 74 is reducing the wheel oscillation. If the oscillation is increasing (decision block 76 answered negatively), then the target braking signal (i.e., target braking loads $F_B$, the target time interval $T_B$) are adjusted in step 78. In another embodiment, if only one brake 22a, 22b is being applied, then in step 78, the target braking signals are adjusted for application of the brake 22a, 22b by time shifting the original braking signal by one half period (see FIG. 5). Otherwise, if both brakes 22a, 22b are being alternately applied to reduce the oscillation, then, in step 78, the target time intervals for applying the braking loads are shifted to thereby reduce the shimmying. It will also be appreciated that the magnitudes of the target braking load $F_B$ and the target time interval $T_B$ can be adjusted in step 78 depending on the detected oscillation event. After step 78, the system 14 loops back to decision block 70, which is discussed above.

As shown in FIG. 6, if the shimmying or oscillation is being reduced (decision block 76 answered affirmatively), then data is saved in the memory module 28 in step 80. This stored data can be analyzed at a later time, for instance, to determine whether the vehicle 10 is damaged, whether the vehicle 10 needs to be repaired, and/or whether any additional shimmy dampers (e.g., mechanical, viscous or passive-element dampers) need to be replaced and/or repaired.

As mentioned above, the system 14 can include a sensor 29 that can detect a characteristic of the vehicle 10, such as the tire pressure, the ambient temperature, wet/dry road conditions, etc. In some embodiments, data from the sensor 29 can also be stored in the memory module 28, and the shimmy/oscillation data stored in memory can be correlated therewith to detect certain trends and changed components (e.g. tire pressure, wear) of the vehicle 10. For instance, this correlated data can be used to determine the conditions in which the vehicle 10 oscillates/shimmies above a certain threshold, etc. The controller 24 can rely on this correlated data and history to learn and adjust a target braking signal for reducing such oscillation/shimmy in the future.

Accordingly, the shimmy mitigation system 14 can provide several advantages. For instance, the system 14 can significantly improve operation of the vehicle 10 without significantly increasing costs. For instance, the system 14 can be relatively inexpensive because it can incorporate existing hardware of the vehicle 10, and the system 14 can be implemented largely by software and programming included on the controller 24. For instance, the existing electronic brake control system, traction control system, and/or steering angle sensor 20 of the vehicle 10 can be employed in the shimmy mitigation system 14 described above, and the existing ECU of the vehicle 10 can be programmed to provide the functionality described above. Accordingly, the system 14 can significantly improve the vehicle 10 without having to significantly increase material costs, manufacturing time, etc.

Furthermore, the system 14 can be redundant to and act as a failsafe system for other conventional shimmy dampers (e.g., mechanical, viscous or passive-element dampers). As such, the system 14 can compliment these dampers. Also, the system 14 can be used to diagnose any existing problems in the other shimmy dampers, as described above. Also, if there is oscillation/shimmy that is below a predetermined threshold necessary for activating the conventional shimmy dampers, the system 14 can be used to detect this low-level oscillation/shimmying, and data representative of this oscillation/shimmy can be recorded by the system 14 for operator notification and future analysis.

The description of the present disclosure is merely exemplary in nature and, thus, variations that do not depart from the gist of the present disclosure are intended to be within the scope of the present disclosure. Such variations are not to be regarded as a departure from the spirit and scope of the present disclosure.

What is claimed is:

1. A method of reducing shimmy of a wheel of a vehicle, the wheel including a wheel brake and being rotatable about a central axis, steerable by varying a steering angle of the wheel about a steering axis that is arranged orthogonal to the central axis, and having either a positive or a negative scrub radius, the method comprising:
   detecting an oscillation/shimmy of the steering angle of the wheel about the steering axis in a first direction; and
   selectively applying a braking load with the wheel brake to decelerate rotation of the wheel about the central axis, and due to the wheel having the scrub radius, bias the wheel about the steering axis in a second direction opposite to the first direction to counteract the oscillation/shimmy of the steering angle of the wheel about the steering axis:
   wherein selectively applying the braking load includes:
      outputting a first signal to selectively apply a first braking load,
      detecting whether the first braking load increases an amplitude of the oscillation/shimmy of the steering angle, and
      outputting a second signal to selectively apply a second braking load to counteract the increased amplitude of the oscillation/shimmy, the corrective signal being different from the initial signal.

2. The method of claim 1, further comprising determining a time interval for applying the braking load necessary for reducing the oscillation/shimmy, and wherein selectively applying the braking load includes selectively applying the braking load approximately during the time interval.

3. The method of claim 1, further comprising determining a target magnitude of the braking load for reducing the oscillation/shimmy, and wherein selectively applying the braking load includes selectively applying the braking load approximately equal to the target magnitude.

4. The method of claim 1, wherein detecting the oscillation/shimmy includes detecting turning of the wheel in a first direction about the steering axis, and wherein selectively applying the braking load includes selectively applying the braking load to bias turning of the wheel in a second direction about the steering axis that is opposite the first direction.

5. The method of claim 1, further comprising:
   determining a target time interval for applying the braking load and determining a target magnitude of the braking load for reducing the oscillation/shimmy; and
   determining if the target magnitude is greater than a predetermined braking limit of the wheel, and
   wherein selectively applying the braking load includes selectively applying the braking load during an actual time interval and at an actual magnitude, wherein the actual time interval is greater than the target time interval, and wherein the actual magnitude is less than the target magnitude.

6. The method of claim 1, further comprising outputting an alarm signal to indicate the oscillation/shimmy of the steering angle of the wheel.

7. The method of claim 1, wherein the vehicle includes a first wheel and a second wheel that are cooperatively steerable to steer the vehicle, wherein the first wheel includes a first brake, and wherein the second wheel includes a second brake, and further comprising determining which of the first and second brakes to selectively apply the respective braking load to reduce the oscillation/shimmy.

8. The method of claim 7, wherein selectively applying the braking load includes alternatingly applying the respective braking load to the first and second brakes.

9. The method of claim 7, wherein selectively applying the braking load includes applying only one of the respective braking load to the first and second brakes.

* * * * *